(12) United States Patent
Zhang et al.

(10) Patent No.: US 8,964,142 B2
(45) Date of Patent: Feb. 24, 2015

(54) BACKLIGHT MODULE AND LIQUID CRYSTAL DISPLAY DEVICE

(75) Inventors: Pangling Zhang, Shenzhen (CN); Yue Wu, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 218 days.

(21) Appl. No.: 13/503,654

(22) PCT Filed: Apr. 19, 2012

(86) PCT No.: PCT/CN2012/074334
§ 371 (c)(1),
(2), (4) Date: Apr. 23, 2012

(87) PCT Pub. No.: WO2013/143191
PCT Pub. Date: Oct. 3, 2013

(65) Prior Publication Data
US 2013/0258236 A1    Oct. 3, 2013

(30) Foreign Application Priority Data
Mar. 29, 2012    (CN) .......................... 2012 1 0088081

(51) Int. Cl.
*G02F 1/1333*    (2006.01)

(52) U.S. Cl.
USPC .......................................................... 349/58

(58) Field of Classification Search
USPC ..................................................... 349/58–60
See application file for complete search history.

(56) References Cited

U.S. PATENT DOCUMENTS 7,800,707 B2 *    9/2010    Hsieh ............................... 349/58

* cited by examiner

*Primary Examiner* — Phu Vu

(57) ABSTRACT

The present invention is related to a backlight module and a liquid crystal display device, and includes a light source, a light guide plate, a back plate, a fixed retaining part and an elastic retaining part. The edge of the back plate is formed with a peripheral frame perpendicular to a plane of the back plate. One end of the elastic retaining part is connected to the peripheral frame, and the other end of the elastic retaining part is elastically connected to a surface of the light guide plate opposite to the light input surface. The cost of the present invention is low and the manufacture thereof is simple, while the deformation of the light guide plate due to the temperature can be transferred to a surface of the light guide plate opposite to the light input surface.

14 Claims, 3 Drawing Sheets

BACKLIGHT MODULE AND LIQUID CRYSTAL DISPLAY DEVICE

FIELD OF THE INVENTION

The present invention relates to the field of the display, and more particularly to a backlight module and a liquid crystal display device for improving the display effect.

BACKGROUND OF THE INVENTION

The liquid crystal display (LCD) has been widely used in various electronic products, most of the liquid crystal display are backlight type liquid crystal display including the display panel and the backlight module. According to the incident position of the light source, the backlight module can be classified into the side-light type and direct-light type.

The backlight module typically includes a light source and a light guide plate; In order to guarantee the display effect of the liquid crystal display, it needs to keep a stable optically coupling distance between the light source and the light input surface of the light guide plate. Because the internal space of the backlight module is sealed, it is difficult to carry out the convection of the internal air with the external air. Therefore, when the backlight module is used, the temperature of the light source is higher, especially the light source of the side-light type backlight module. Thereby, the temperature of the light input surface of the light guide plate close to the light source is also higher. It causes the light guide plate to easily generate substantial thermal expansion, warpage and other structural variations, so that the distance between the light source and the light input surface of the light guide plate is changed. Thus, the display effect of the liquid crystal display is affected.

In order to reduce the deformation of the light guide plate caused by the temperature rise of the light source, people try to produce suitable heat sinks to reduce the temperature of the light source; however, the manufacturing cost of the backlight module will be greatly increased.

Therefore, it is necessary to provide a backlight module and a liquid crystal display device to solve the problems of the traditional technology.

SUMMARY OF THE INVENTION

The present invention provides a backlight module and a liquid crystal display device, which can transfer the deformation of the light guide plate caused by the temperature to a surface of the light guide plate opposite to the light input surface, wherein the cost of the backlight module is low and the manufacture thereof is simple. Thus, it solves the technical problem of the traditional backlight module and the traditional liquid crystal display device which cannot guarantee the optically coupling distance between the light source and the light input surface of the light guide plate or cannot lower the high manufacture cost of the backlight module.

The present invention relates to a backlight module, comprising: a light source; a light guide plate guiding light generated from the light source; a back plate having edges formed with a peripheral frame perpendicular to a plane of the back plate, and carrying the light guide plate; a fixed retaining part mounted on the back plate and being in contact with a light input surface of the light guide plate; and an elastic retaining part having one end connected to the peripheral frame and the other end elastically connected to a surface of the light guide plate opposite to the light input surface; wherein the elastic retaining part includes a retaining plate, an elastic metal strip and a connecting part connecting the retaining plate to the elastic metal strip; the retaining plate is in contact with the surface opposite to the light input surface, and the elastic metal strip is in contact with the peripheral frame; wherein the connecting part is a bolt, the retaining plate is formed with a hollow convex portion which has a first through hole thereon, the elastic metal strip is formed with a second through hole, and a thread rod of the bolt passes through the first through hole and the second through hole; wherein a head portion of the bolt is installed within the convex portion, the diameter of the first through hole is greater than the diameter of the thread rod of the bolt, and the diameter of the first through hole is smaller than the diameter of the head portion of the bolt; and wherein an end of the thread rod of the bolt is formed with an outer thread, and the second through hole is formed with an inner thread corresponding to the internal thread.

The present invention also relates to a backlight module, comprising: a light source; a light guide plate guiding light generated from the light source; a back plate having edges formed with a peripheral frame perpendicular to a plane of the back plate, and carrying the light guide plate; a fixed retaining part mounted on the back plate and being in contact with a light input surface of the light guide plate; and an elastic retaining part having one end connected to the peripheral frame and the other end elastically connected to a surface of the light guide plate opposite to the light input surface.

In the backlight module of the present invention, the elastic retaining part is a spring, one end of the spring is connected to the peripheral frame, and the other end of the spring is elastically connected to the surface of the light guide plate opposite to the light input surface.

In the backlight module of the present invention, the elastic retaining part is an elastic strip, one end of the elastic strip is connected to the peripheral frame, and the other end of the elastic strip is connected to the surface of the light guide plate opposite to the light input surface.

In the backlight module of the present invention, the elastic retaining part includes a retaining plate, an elastic metal strip and a connecting part connecting the retaining plate to the elastic metal strip; the retaining plate is in contact with the surface of the light guide plate opposite to the light input surface, and the elastic metal strip is in contact with the peripheral frame.

In the backlight module of the present invention, the connecting part is a bolt, the retaining plate is formed with a hollow convex portion which has a first through hole thereon, the elastic metal strip is formed with a second through hole, and a thread rod of the bolt passes through the first through hole and the second through hole.

In the backlight module of the present invention, a head portion of the bolt is installed within the convex portion, the diameter of the first through hole is greater than the diameter of the thread rod of the bolt, and the diameter of the first through hole is smaller than the diameter of the head portion of the bolt.

In the backlight module of the present invention, a distal end of the thread rod of the bolt is formed with an outer thread, and the second through hole is formed with an inner thread corresponding to the outer thread.

In the backlight module of the present invention, the elastic metal strip is connected to the peripheral frame by the bolt; the peripheral frame is formed with a third through hole thereon, and the third through hole has an inner thread corresponding to the outer thread.

In the backlight module of the present invention, a distance between a head portion of the bolt and the surface of the light guide plate opposite to the light input surface is greater than the maximum deformation of the light guide plate in the corresponding direction before the light guide plate is deformed.

In the backlight module of the present invention, the connecting part is a thread rod, the retaining plate is formed with a hollow convex portion which has a first through hole thereon, the elastic metal strip is formed with a second through hole, and the thread rod passes through the first through hole and the second through hole.

In the backlight module of the present invention, the diameter of the first through hole is greater than the diameter of the thread rod of the bolt.

In the backlight module of the present invention, the bolt has an outer thread, and the second through hole is formed with an inner thread corresponding to the outer thread.

In the backlight module of the present invention, the elastic metal strip is connected to the peripheral frame peripheral frame by the bolt; the peripheral frame is formed with a third through hole thereon, and the third through hole has an inner thread corresponding to the outer thread.

In the backlight module of the present invention, a distance between a head portion of the bolt and the surface of the light guide plate opposite to the light input surface is greater than the maximum deformation of the light guide plate in the corresponding direction before the light guide plate is deformed.

The present invention also relates to a liquid crystal display device comprising: a display panel; and a backlight module including: a light source; a light guide plate guiding light generated from the source; a back plate having edges formed with a peripheral frame perpendicular to a plane of the back plate, and carrying the light guide plate; a fixed retaining part mounted on the back plate and being in contact with a light input surface of the light guide plate; and an elastic retaining part having one end connected to the peripheral frame and the other end elastically connected to a surface of the light guide plate opposite to the light input surface.

In the liquid crystal display device of the present invention, the elastic retaining part is a spring, one end of the spring is connected to the peripheral frame, and the other end of the spring is connected to the surface of the light guide plate opposite to the light input surface.

In the liquid crystal display device of the present invention, the elastic retaining part is an elastic strip, one end of the elastic strip is connected to the peripheral frame, and the other end of the elastic strip is connected to the surface of the light guide plate opposite to the light input surface.

In the liquid crystal display device of the present invention, the elastic retaining part includes a retaining plate, an elastic metal strip and a connecting part connecting the retaining plate to the elastic metal strip; the retaining plate is in contact with the surface of the light guide plate opposite to the light input surface, and the elastic metal strip is in contact with the peripheral frame.

In the liquid crystal display device of the present invention, the connecting part is a bolt, the retaining plate is formed with a hollow convex portion which has a first through hole thereon, the elastic metal strip is formed with a second through hole, and a thread rod of the bolt passes through the first through hole and the second through hole.

The backlight module and the liquid crystal display device according to the configuration of the present invention, its cost of the present invention is low and the manufacture thereof is simple, while the deformation of the light guide plate due to the temperature can be transferred to a surface of the light guide plate opposite to the light input surface. Thus, it solves the technical problem of the traditional backlight module and the traditional liquid crystal display device which cannot guarantee the optically coupling distance between the light source and the light input surface of the light guide plate or cannot lower the high manufacture cost of the backlight module.

For the present invention described above will be more apparent, the following specific preferable embodiment with the accompanying drawings will be elaborated as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

In the figures, the similar structural unit is designated by the same reference numbers.

Figure 1:
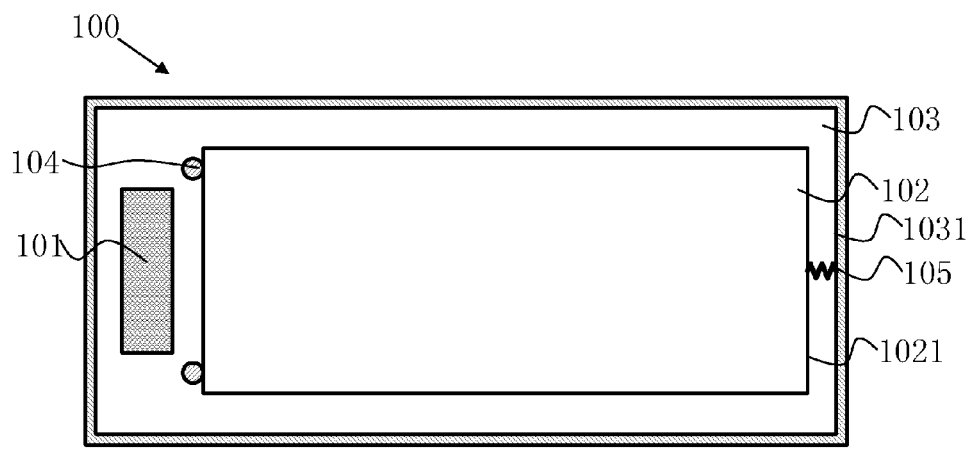
FIG. 1 is a structural schematic view according to the first preferred embodiment of the backlight module in the present invention.

The present invention relates to a backlight module; referring to FIG. 1,

FIG. 1 is a structural schematic view according to the first preferred embodiment of the backlight module in the present invention. The backlight module 100 comprises a light source 101, a light guide plate 102, a back plate 103, a fixed retaining part 104 and an elastic retaining part. The light source 101 is used to provide the backlight source for the corresponding display panel; the light guide plate 102 is used to guide light generated from the light source 101; the back plate is used to carry the light guide plate 102; the fixed retaining part 104 is mounted on the back plate 103 and in contact with the light input surface of the light guide plate in order to fix the light input surface of the light guide plate; edges of the back plate 103 are formed with a peripheral frame 1031 perpendicular to a plane of the back plate 103; one end of the elastic retaining part is connected to the peripheral frame 1031, and the other end is elastically connected to a surface 1021 of the light guide plate 102 opposite to the light input surface. In this embodiment, the elastic retaining part is a spring 105, wherein one end of the spring 105 is connected to the peripheral frame 1031 and the other end of the spring 105 is in contact with the surface 1021 of the light guide plate 102 opposite to the light input surface.

When the backlight module 100 of this embodiment is used, the light guide plate 102 of the backlight module 100 is initially not deformed, the fixed retaining part 104 limits the light input surface of the light guide plate 102, and the spring 105 limits the surface 1021 of the light guide plate 102 opposite to the light input surface. Herein, the spring 105 is kept at a compressed state that can effectively avoid the offset of the light guide plate 102 and guarantee the optically coupling distance between the light source 101 and the light guide plate 102.

If the light guide plate 102 of the backlight module 100 is deformed due to the temperature rise, the fixed retaining part 104 limits the light input surface of the light guide plate 102 to fix the light input surface, thus the surface 1021 of the light guide plate 102 opposite to the light input surface can continue to compress the spring 105, thereby releases thermal stress within the light guide plate 102. Therefore, this not only guarantees a stable optically coupling distance between the light source 101 and the light input surface of the light guide plate 102, but also avoids the warpage of the light guide plate 102 due to the temperature rise.

Figure 2:
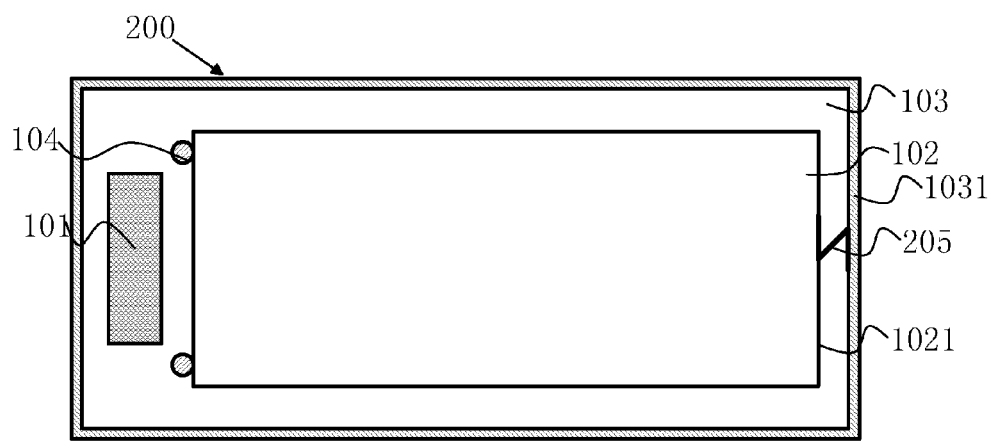
FIG. 2 is a structural schematic view according to the second preferred embodiment of the backlight module in the present invention.

Referring to FIG. 2, FIG. 2 is a structural schematic view according to the second preferred embodiment of the backlight module in the present invention. The difference between the second preferred embodiment and the first preferred embodiment is that: the elastic retaining part is an elastic strip 205, and one end of the elastic strip 205 is connected to the peripheral frame 1031 and the other end of the elastic strip 205 is connected to the surface 1021 of the light guide plate 102 opposite to the light input surface.

When the backlight module 200 of this embodiment is used, the light guide plate 102 of the backlight module 200 is initially not deformed, the fixed retaining part 104 limits the light input surface of the light guide plate 102, and the elastic strip 205, the same as the spring 105 of the last embodiment, limits the surface 1021 of the light guide plate 102 opposite to the light input surface. Herein, the elastic spring 205 is kept at a compressed state, which can effectively avoid the offset of the light guide plate 102 and guarantee the optically coupling distance between the light source 101 and the light guide plate 102.

If the light guide plate 102 of the backlight module 100 is deformed due to the temperature rise; the fixed retaining part 104 limits the light input surface of the light guide plate 102 to fix the light input surface, thus the surface 1021 of the light guide plate 102 opposite to the light input surface can continue to compress the elastic strip 205, thereby releases thermal stress within the light plate 102.

Therefore, this not only guarantees a stable optically coupling distance between the light source 101 and the light input surface of the light guide plate 102, but also avoids the warpage of the light guide plate 102 due to the temperature rise. Meanwhile, in this embodiment, one end of the elastic strip 205 can be in planar contact with and screw-connected to the peripheral frame 1031, and the other end can be in planar contact with the surface 1021 of the light guide plate 102 opposite to the light input surface, so it causes the stress more uniform between the light guide plate 102 and the elastic strip 205 and between the elastic strip 205 and the back plate 103 without damaging the light guide plate 102 and the back plate 103.

Figure 3:
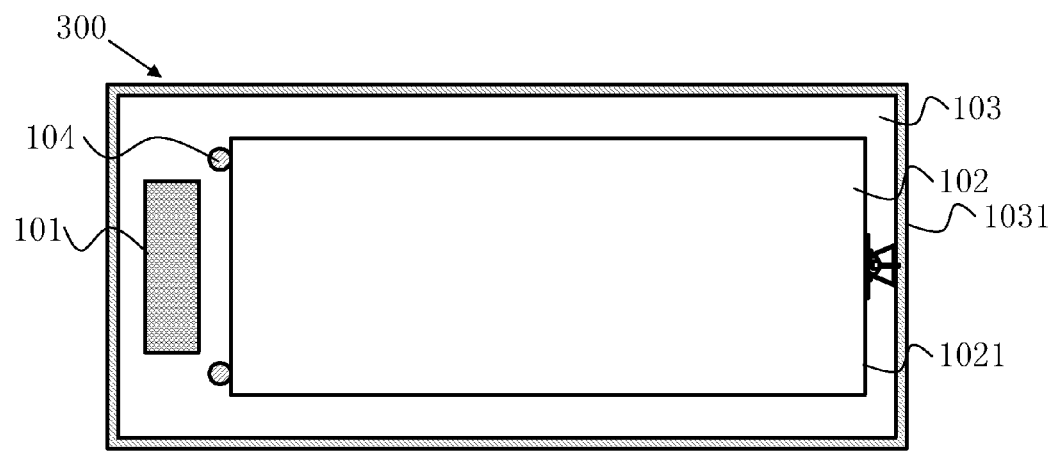
FIG. 3 is a structural schematic view according to the third preferred embodiment of the backlight module in the present invention.
Figure 4:
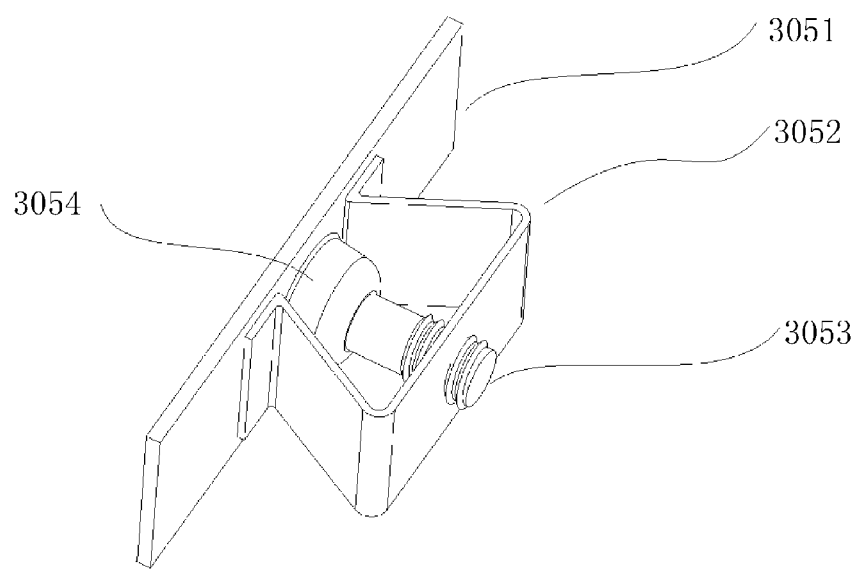
FIG. 4 is a structural schematic view of the elastic retaining part according to the third preferred embodiment of the backlight module in the present invention.

Referring to FIG. 3 and FIG. 4, FIG. 3 is a structural schematic view according to the third preferred embodiment of the backlight module in the present invention and FIG. 4 is a structural schematic view of the elastic retaining part according to the third preferred embodiment of the backlight module in the present invention. The difference between the third preferred embodiment and the first preferred embodiment is that it uses an elastic retaining part with a special structure. The elastic retaining part includes a retaining plate 3051, an elastic metal strip 3052 and a connecting part 3053; the retaining plate 3051 is in contact with the surface 1021 of the light guide plate 102 opposite to the light input surface; the elastic metal strip 3052 is in contact with the peripheral frame 1031; the connecting part 3053 is used to connect the retaining plate 3051 to the elastic metal strip 3052.

The retaining plate 3051 is formed with a hollow convex portion 3054 which has a first through hole thereon. The elastic metal strip 3052 is formed with a second through hole. The connecting part 3053 is a bolt, including a head portion and a thread rod, the head portion is installed within the convex portion 3054; the thread rod passes through the first and the second through holes; the diameter of the first through hole is greater than the diameter of the diameter of the thread rod; the diameter of the first through hole is smaller than the diameter of the head portion of the bolt; the distal end of the thread rod of the bolt is formed with an outer thread, and the second through hole is formed with an inner thread corresponding to the outer thread, so that the bolt is screw-connected to the second through hole of the elastic metal strip 3052 by the outer thread of the distal end of the thread rod, and the bolt is connected to the retaining plate 3051 by installing the head portion within the convex portion 3054. Meanwhile, the peripheral frame 1031 is formed with a third through hole thereon; the end portion of the bolt protruding the elastic metal strip 3052 can be screw-connected to the third through hole of the peripheral frame 1031, so that the elastic metal strip 3052 can be tightly in contact with the peripheral frame 1031.

Figure 5A:
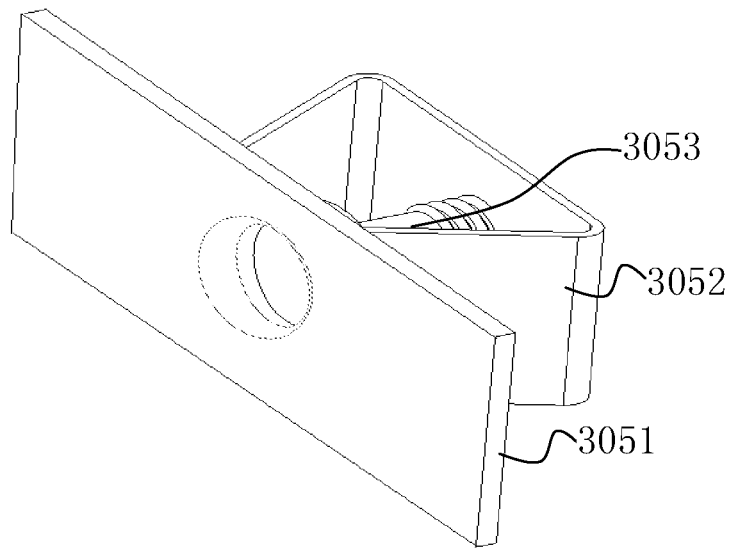
FIG. 5A is a structural schematic view of the elastic retaining part before deforming, according to the third preferred embodiment of the backlight module in the present invention.
Figure 5B:
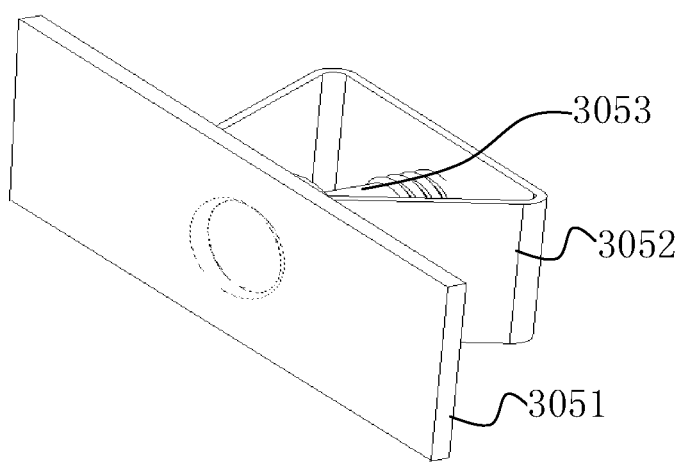
FIG. 5B is a structural schematic view of the elastic retaining part during deforming, according to the third preferred embodiment of the backlight module in the present invention.

When the backlight module 300 of this embodiment is used, as FIG. 5A and FIG. 5B shown, FIG. 5A is a structural schematic view of the elastic retaining part before deforming, according to the third preferred embodiment of the backlight module in the present invention and FIG. 5B is a structural schematic view of the elastic retaining part during deforming, according to the third preferred embodiment of the backlight module in the present invention. If the light guide plate 102 of the backlight module 300 is still not deformed, as FIG. 5A shown, the fixed retaining part 104 limits the light input surface of the light guide plate 102. By the retaining plate 3051, the elastic retaining part limits the surface 1021 of the light guide plate 102 opposite to the light input surface. Herein, the elastic metal strip 3052 is kept at a compressed state, which can effectively avoid the offset of the light guide plate 102 and guarantee the optically coupling distance between the light source 101 and the light guide plate 102. At this moment, because the light guide plate 102 is not deformed, the distance is greater between the head portion of the bolt and the surface 1021 of the light guide plate 102 opposite to the light input surface.

If the light guide plate 102 of the backlight module 300 is deformed due to the temperature rise, as FIG. 5B shown, the light input surface is fixed because the fixed retaining part 104 limits the light input surface of the light guide plate 102, and the surface 1021 of the light guide plate 102 opposite to the light input surface can continue to compress the elastic metal strip 3052 by the retaining plate 3051, thereby releases the thermal stress within the light plate 102. At this moment because the distance between the light guide plate 102 is deformed, the distance is smaller between the head portion of the bolt and the surface 1021 of the light guide plate 102 opposite to the light input surface. However, the head portion of the bolt is not in contact with the surface 1021 of the light guide plate 102 opposite to the light input surface (i.e., before the light guide plate 102 is deformed, the distance between the head portion of the bolt and the surface 1021 of the light guide plate 102 opposite to the light input surface is greater than the maximum deformation of the light guide plate in the corresponding direction.)

Therefore, this not only guarantees the optically coupling distance between the light source 101 and the light input surface of the light guide plate 102, but also avoids the warpage of the light guide plate 102 due to the temperature rise. Meanwhile, in this embodiment, the elastic metal strip 3052 is in planar contact with and screw-connected to peripheral frame 1031, and the retaining plate 3051 can be in planar contact with the surface 1021 of the light guide plate 102 opposite to the light input surface (when the elastic strip 205 of the second preferred embodiment is kept at compressed state, it is possible to cause the light guide plate 102 lineally in contact with the elastic strip 205), so it causes the stress more uniform between the light guide plate 102 and the retaining plate 3051 and between the elastic metal strip 3052 and the back plate 103 without damaging the light guide 102 and the back plate 103. Meanwhile, the elastic metal strip 3052 and the retaining plate 3051 are integrated into one piece by the bolt, so as to be helpful for the installation of the elastic retaining part.

As the fourth preferred embodiment of the backlight module of the present invention, as FIG. 3 and FIG. 4 shown, the connecting part 3053 is also can be a thread rod merely; the thread rod passes through the first and the second through holes. The diameter of the first through hole is greater than the diameter of the thread rod, and one end of the thread rod is formed with an outer thread, and the second through hole is formed with corresponding to the outer thread, meanwhile, the other end of the thread rod is installed within the convex portion 3054 to retaining the thread rod. Meanwhile, the peripheral frame is formed with a third through hole thereon; the end portion of the bolt protruding the elastic metal strip 3052 can be screwed the third through hole of the peripheral frame 1031, so that the elastic metal strip 3052 can be tightly in contact with the peripheral frame 1031.

When the backlight module of the present embodiment is used, the light guide plate 102 of the backlight module is initially not deformed, the fixed retaining part 104 limits the light input surface of the light guide 102, and by the retaining plate 3051 the elastic retaining part limits the surface 1021 of the light guide plate 102 opposite to the light input surface. Herein, the elastic metal strip 3052 is kept at a compressed state, which can effectively avoid the offset of the light guide plate 102 and guarantee the optically coupling distance between the light source 101 and the light guide plate 102. At this moment because the light guide plate 102 does not deform, the distance is greater between one end of the thread rod of the light guide plate 102 and the surface 1021 of the light guide plate 102 opposite to the light input surface.

If the light guide plate 102 is deformed due to the temperature rise, the fixed retaining part 104 limits the light input surface of the light guide plate 102 to fix the light input surface, and the surface 1021 of the light guide plate 102 opposite to the light input surface can continue to compress the elastic metal strip 3052 by the retaining plate 3051, thereby releases the thermal stress within the light plate 102. At this moment, because the distance between the light guide plate 102 is deformed, the distance is smaller between one end of the thread rod close to the light guide plate 102 and the surface 1021 of the light guide plate 102 opposite to the light input surface. However, the end close to the thread rod of the light guide plate 102 is not contact with the surface 1021 of the light guide plate 102 opposite to the light input surface (that is, before the light guide plate 102 is deformed, the distance between the end close to the thread rod of the guide plate 102 and the surface 1021 of the light guide plate 102 opposite to the light input surface is greater than the maximum deformation of the light guide plate in the corresponding direction.)

Therefore, this not only guarantees a stable optically coupling distance between the light source 101 and the light input surface of the light guide plate 102, but also avoids the warpage of the light guide plate 102 due to the temperature rise. This embodiment is like or similar to the third preferred embodiment, but the structure of this embodiment is simpler.

The present invention also relates to a liquid crystal display device, comprising: a display panel; and a backlight module which includes a light source, a light guide plate, a back plate, a fixed retaining part and an elastic retaining part. The light source is used to provide the backlight source for the corresponding display panel; the light guide plate is used to guide light generated from the light guide source to fix the light input surface of the light guide plate; edges of the back plate are formed with a peripheral frame perpendicular to a plane of the back plate; one end of the elastic retaining part is connected to the peripheral frame, and the other end of the elastic retaining part is elastically connected to the surface of the light guide plate opposite to the light input surface. The working principle and beneficial effect of the liquid crystal display device of the present invention is like or similar to the specific embodiment(s) described of the backlight module; please refer to the specific embodiment(s) of the backlight plate module described above.

As described above, according to the backlight module in the present invention, the cost of the present invention is low and the manufacture thereof is simple, while the deformation of the light guide plate due to the temperature can be transferred to a surface of the light guide plate opposite to the light input surface. Thus, it solves the technical problem of the traditional backlight module and the traditional liquid crystal display device which cannot guarantee the optically coupling distance between the light source and the light input surface of the light guide plate or cannot lower the high manufacture cost of the backlight module.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, comprising:
a light source;
a light guide plate guiding light generated from the light source;
a back plate having edges formed with a peripheral frame perpendicular to a plane of the back plate, and carrying the light guide plate;
a fixed retaining part mounted on the back plate and being in contact with a light input surface of the light guide plate; and
an elastic retaining part having one end connected to the peripheral frame and the other end elastically connected to a surface of the light guide plate opposite to the light input surface;
wherein the elastic retaining part includes a retaining plate, an elastic metal strip and a connecting part connecting the retaining plate to the elastic metal strip; the retaining plate is in contact with the surface opposite to the light input surface, and the elastic metal strip is in contact with the peripheral frame;

wherein the connecting part is a bolt, the retaining plate is formed with a hollow convex portion which has a first through hole thereon, the elastic metal strip is formed with a second through hole, and a thread rod of the bolt passes through the first through hole and the second through hole;

wherein a head portion of the bolt is installed within the convex portion, the diameter of the first through hole is greater than the diameter of the thread rod of the bolt, and the diameter of the first through hole is smaller than the diameter of the head portion of the bolt; and wherein an end of the thread rod of the bolt is formed with an outer thread, and the second through hole is formed with an inner thread corresponding to the internal thread.

2. A backlight module, comprising:

a light source;

a light guide plate guiding light generated from the light source;

a back plate having edges formed with a peripheral frame perpendicular to a plane of the back plate, and carrying the light guide plate;

a fixed retaining part mounted on the back plate and being in contact with a light input surface of the light guide plate; and an elastic retaining part having one end connected to the peripheral frame and the other end elastically connected to a surface of the light guide plate opposite to the light input surface;

wherein the elastic retaining part includes a retaining plate, an elastic metal strip and a connecting part connecting the retaining plate to the elastic metal strip; the retaining plate is in contact with the surface of the light guide plate opposite to the light input surface, and the elastic metal strip is in contact with the peripheral frame; and wherein the connecting part is a bolt, the retaining plate is formed with a hollow convex portion which has a first through hole thereon, the elastic metal strip is formed with a second through hole, and a thread rod of the bolt passes through the first through hole and the second through hole.

3. The backlight module according to claim 2, wherein the elastic retaining part is a spring, one end of the spring is connected to the peripheral frame, and the other end of the spring is elastically connected to the surface of the light guide plate opposite to the light input surface.

4. The backlight module according to claim 2, wherein a head portion of the bolt is installed within the convex portion, the diameter of the first through hole is greater than the diameter of the thread rod of the bolt, and the diameter of the first through hole is smaller than the diameter of the head portion of the bolt.

5. The backlight module according to claim 2, wherein a distal end of the thread rod of the bolt is formed with an outer thread, and the second through hole is formed with an inner thread corresponding to the outer thread.

6. The backlight module according to claim 5, wherein the elastic metal strip is connected to the peripheral frame by the bolt; the peripheral frame is formed with a third through hole thereon, and the third through hole has an inner thread corresponding to the outer thread.

7. The backlight module according to claim 6, wherein a distance between a head portion of the bolt and the surface of the light guide plate opposite to the light input surface is greater than the maximum deformation of the light guide plate in the corresponding direction before the light guide plate is deformed.

8. A backlight module, comprising:

a light source;

a light guide plate guiding light generated from the light source;

a back plate having edges formed with a peripheral frame perpendicular to a plane of the back plate, and carrying the light guide plate;

a fixed retaining part mounted on the back plate and being in contact with a light input surface of the light guide plate; and an elastic retaining part having one end connected to the peripheral frame and the other end elastically connected to a surface of the light guide plate opposite to the light input surface;

wherein the elastic retaining part includes a retaining plate, an elastic metal strip and a connecting part connecting the retaining plate to the elastic metal strip; the retaining plate is in contact with the surface of the light guide plate opposite to the light input surface, and the elastic metal strip is in contact with the peripheral frame; and wherein the connecting part is a thread rod, the retaining plate is formed with a hollow convex portion which has a first through hole thereon, the elastic metal strip is formed with a second through hole, and the thread rod passes through the first through hole and the second through hole.

9. The backlight module according to claim 8, wherein the diameter of the first through hole is greater than the diameter of the thread rod of the bolt.

10. The backlight module according to the claim 8, wherein the bolt has an outer thread, and the second through hole is formed with an inner thread corresponding to the outer thread.

11. The backlight module according to claim 10, wherein the elastic metal strip is connected to the peripheral frame peripheral frame by the bolt; the peripheral frame is formed with a third through hole thereon, and the third through hole has an inner thread corresponding to the outer thread.

12. The backlight module according to claim 11, wherein a distance between a head portion of the bolt and the surface of the light guide plate opposite to the light input surface is greater than the maximum deformation of the light guide plate in the corresponding direction before the light guide plate is deformed.

13. A liquid crystal display device, comprising:

a display panel; and a backlight module including:
    a light source;
    a light guide plate guiding light generated from the source;
    a back plate having edges formed with a peripheral frame perpendicular to a plane of the back plate, and carrying the light guide plate;
    a fixed retaining part mounted on the back plate and being in contact with a light input surface of the light guide plate; and
    an elastic retaining part having one end connected to the peripheral frame and the other end elastically connected to a surface of the light guide plate opposite to the light input surface;
    wherein the elastic retaining part includes a retaining plate, an elastic metal strip and a connecting part connecting the retaining plate to the elastic metal strip; the retaining plate is in contact with the surface of the light guide plate opposite to the light input surface, and the elastic metal strip is in contact with the peripheral frame; and wherein the connecting part is a bolt, the retaining plate is formed with a hollow convex portion which has a first through hole thereon, the elastic metal strip is formed with a second through hole, and a thread rod of the bolt passes through the first through hole and the second through hole.

14. The liquid crystal display device according to claim 13, wherein the elastic retaining part is a spring, one end of the spring is connected to the peripheral frame, and the other end of the spring is connected to the surface of the light guide plate opposite to the light input surface.

* * * * *